TRANSISTOR CIRCUIT

Filed Oct. 31, 1956

INVENTOR.
HOWARD E. TOMPKINS

BY

J. Walter Schilpp
ATTORNEY

United States Patent Office 2,839,686

Patented June 17, 1958

2,839,686

TRANSISTOR CIRCUIT

Howard E. Tompkins, Ridley Park, Pa., assignor to Burroughs Corporation, Detroit, Mich., a corporation of Michigan Application October 31, 1956, Serial No. 619,550

10 Claims. (Cl. 250—36)

Figure 1:
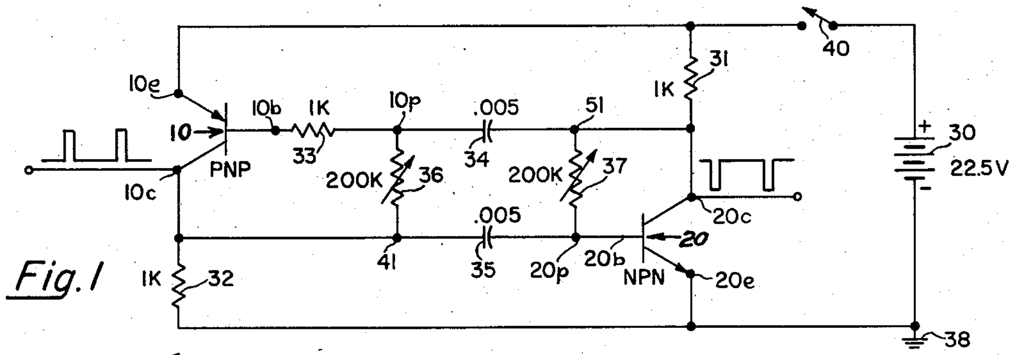

This invention relates to a device employing a pair of transistors both of which are conductive during the same time periods and both of which are non-conductive during the same other time periods.

In one form of the invention, the device is astable or free-running and may be properly referred to as a multivibrator.

The device differs from the prior art in that in the conventional device one tube or transistor is "on" while the other is "off," whereas in the device of the invention both transistors are "on" during one period of the cycle and both are "off" during the other period.

I have found that the device of the present invention consumes appreciably less power than the conventional type, particularly where the "on" period is short relative to the total period of the cycle.

A broad object, then, of the present invention is to provide a device capable of producing wave forms of low duty factor with improved economy of power supply.

Another object of the invention is to provide a device for producing time-spaced pulses with a minimum consumption of power, the saving in power being greater where the pulse width is shorter relative to the spacing between pulses.

Another object is to provide a circuit capable of producing simultaneously two series of pulses of opposite polarity and with a minimum consumption of power.

A more specific object is to provide a transistor multivibrator having improved economy of power supply.

These and other objects of the invention are accomplished by coupling a PNP transistor to an NPN transistor in such manner that both transistors are "on" at the same one time period and both are "off" at the same other time period. Outputs may be taken from each of the transistors, the output from one transistor being a series of time-spaced pulses whose polarity is opposite to that of the series of pulses delivered at the other transistor.

In one form, the base of each transistor is A.-C. coupled to the collector of the other and the device is astable and operates as a free-running multivibrator. In this form, the duration of the period between pulses is readily controlled, being determined by physical resistance and capacitance elements in the circuit, and during this period no power is consumed since both transistors are "off," i. e., non-conductive except for leakage currents which are of negligible magnitude and which may be ignored.

Figure 2:
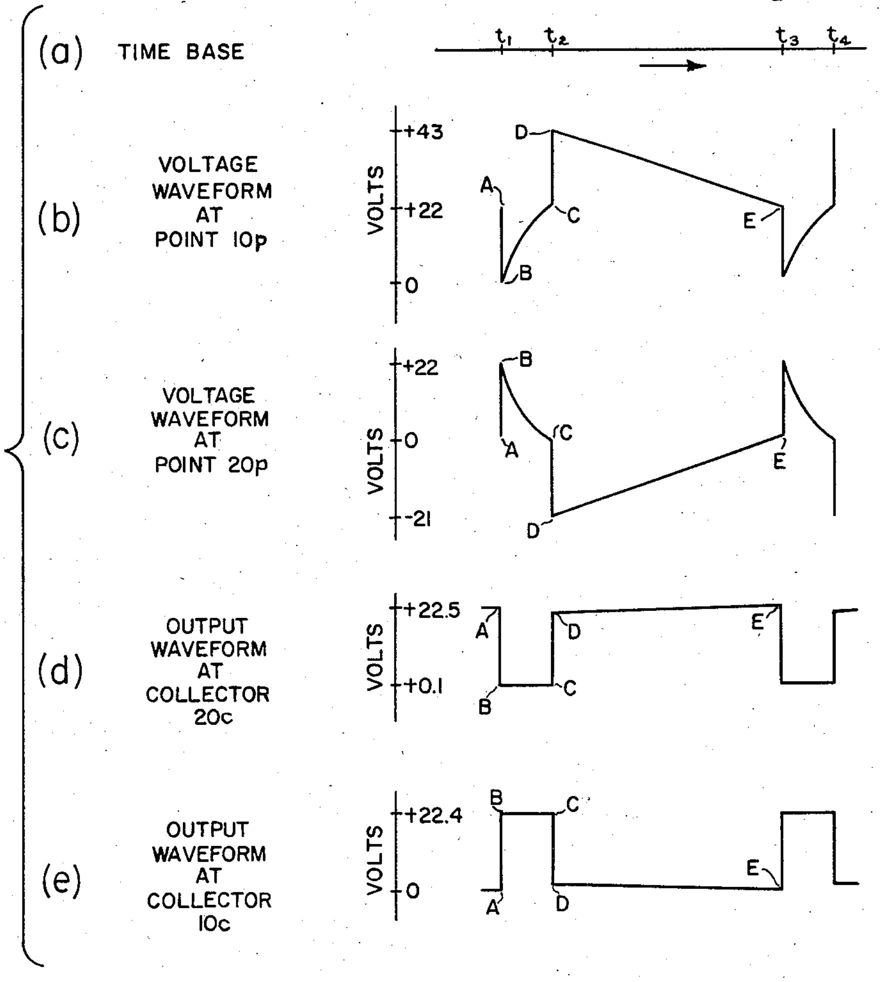

While the foregoing is a summary, the invention will be best understood from a consideration of the following detailed description taken together with the drawing in which:

Fig. 1 is a schematic representation of a preferred form of the multivibrator of the present invention; and Fig. 2 is a graph showing the wave forms at several points in the circuit of Fig. 1.

Referring now to Fig. 1, the transistor 10 shown on the left is a PNP transistor having an emitter 10*e*, a base 10*b*, and a collector 10*c*, while the transistor 20 shown on the right is an NPN transistor having an emitter 20*e*, a base 20*b*, and a collector 20*c*. A battery 30 has its positive terminal connected directly to the emitter 10*e* of transistor 10 and its negative terminal connected directly to the emitter 20*e* of transistor 20. The positive terminal of battery 30 is also connected by way of resistor 31 to the collector 20*c* of transistor 20 and the negative terminal of the battery is connected by way of resistor 32 to the collector terminal 10*c* of transistor 10. The base 10*b* of transistor 10 is coupled by way of resistor 33 and capacitor 34 to the collector of transistor 20, and the base 20*b* of transistor 20 is coupled by way of capacitor 35 to the collector of transistor 20. The base of transistor 10 is also connected to its own collector by way of the base resistor 33 and a resistor 36, shown in the drawing to be variable. Similarly, the base of transistor 20 is connected to its own collector by way of variable resistor 37. The negative terminal of the battery 30 may, if desired, be grounded as at 38 and the outputs of the circuit may be taken from the collectors 10*c* and 20*c* of transistors 10 and 20, respectively.

The operation of the circuit will now be described. Assume that switch 40 has just been closed to turn on the circuit. Current now flows from the positive terminal of the battery into the emitter 10*e* of transistor 10, out the base 10*b*, and through resistors 33, 36 and 32 to the negative terminal of the battery. Current also flows from the positive terminal of the battery through resistors 31 and 37 into the base 20*b* of transistor 20, out the emitter 20*e* and back to the negative terminal of the battery. As a result of these currents flowing, the potential at point 41, located at the collector 10*c* end of resistor 36, moves in a positive direction and the potential at point 51, located at the collector 20*c* end of resistor 37, moves in a negative direction. These voltage changes are transmitted through the coupling capacitors 35 and 34, respectively, to the bases of transistors 20 and 10. Thus, the potential at the base of transistor 20 rises, and that at the base of transistor 10 falls. And, since 20 is an NPN transistor and 10 is a PNP transistor, these changes in base potential are in a direction to increase the emitter bias of each transistor in a forward direction. The action is cumulative and both transistors are driven rapidly into the saturation condition in which their collector current is high and collector-to-emitter voltage drop is very low.

The transition, above described, from cut-off to saturation takes place at (and within) time $t_1$ on the time scale of Fig. 2(*a*). The time scale of Fig. 2(*a*) is assumed to be projected to Figs. 2(*b*), 2(*c*), 2(*d*) and 2(*e*) so that the waveforms shown in these latter figures are all related to the same time base.

Fig. 2(*b*) shows graphically, the voltage at point 10*p* of Fig. 1. This point is located at the common junction of base resistor 33, capacitor 34, and variable resistor 36.

Fig. 2(*c*) shows the voltage at point 20*p* of Fig. 1. This point is located at the common junction of the base of transistor 20, capacitor 35 and variable resistor 37.

Figs. 2(*d*) and 2(*e*) show the output voltages at the collectors 20*c* and 10*c*, respectively.

Referring again to the transition from cut-off to saturation taking place at time $t_1$ the voltages at the various points shown in Figs. 2(*b*), 2(*c*), 2(*d*) and 2(*e*) change in the manner indicated by that portion of the curves lying between points A and B, A being the voltage at cut-off and B being the voltage at saturation. It will be seen that the potentials at junction 10*p* and collector 20*c* fall sharply while those at junction 20*p* and collector 10*c* rise equally sharply.

The capacitors 34 and 35 now start to charge. The charging path for capacitor 34 may be traced from the positive terminal of battery 30 through emitter 10*e*, base 10*b*, resistor 33, the capacitor 34, collector 20*c*, emitter 20*e* and back to the negative terminal of the battery. Similarly, the charging path for capacitor 35 may be traced from the positive battery terminal through emitter 10*e*, collector 10*c*, the capacitor 35, base 20*b*, emitter 20*e*, and thence to the negative battery terminal. As capacitors 34 and 35 charge, the potential at junction 10*p* rises and the potential at junction 20*p* falls. This is indicated in Figs. 2(*b*) and 2(*c*) by that portion of each curve lying between the points B and C. As the potentials at these junctions change in the manner just indicated, the emitter-to-base bias of each transistor becomes insufficient to maintain conduction in the saturation region, the emitter-to-collector current through each transistor rapidly decreases, and the transistors cut off. When the transistors cut off, the potentials at the base of transistor 10 and at the collector of transistor 20 rise sharply, while the potentials at the base of transistor 20 and at the collector of transistor 10 fall sharply. This is indicated in Figs. 2(*b*), 2(*c*), 2(*d*) and 2(*e*) by that portion of each curve lying between points C and D. Also shown in these figures are illustrative values of voltage, assuming battery 30 to be 22.5 volts. It will be noted that after the transistors cut off, the potential at junction 10*p* rises to a value well above the positive potential of the battery 30, while the potential at junction 20*p* falls to a value well below the grounded negative terminal of the battery. This is due, of course, to the fact that the charge on each capacitor is in series with the battery.

With each transistor cut off, the capacitors 34 and 35 now discharge. The discharge path for capacitor 34 includes resistors 31, 36 and 32, while the discharge path for capacitor 35 includes resistors 31, 37 and 32. When the capacitors discharge, the potential at junction 10*p* falls and that at junction 20*p* rises, as is indicated in Figs. 2(*b*) and 2(*c*) by portion DE of each curve. These changes in the base potentials of transistors 10 and 20 are in a direction to increase the forward bias on each transistor, and at point E on each curve (Fig. 2) the transistors again start to conduct and the cycle above described is repeated.

Attention is invited to the fact that the duration of the interval between pulses, shown in Fig. 2 by that portion of each curve lying between points D and E, is determined by the size of the capacitors 34, 35, and the value of the resistances through which each capacitor discharges. Accordingly, this time interval is subject to precise control.

Shown on the circuit of Fig. 1 are illustrative values for the various components. The values shown are those used in a circuit which was actually built and tested. The PNP transistor used was a junction transistor, RCA type TA–153, while the NPN, also a junction transistor, was RCA type TA–207. The circuit shown delivered 22-volt 22-milliampere pulses having a pulse width of 10 microseconds and a total period, depending upon the adjustment of variable resistors 36, 37, of from 60 to 200 microseconds. The pulses delivered at the collector of transistor 20 are negative-going pulses while those delivered at the collector of transistor 10 are positive-going pulses.

The width of the pulse developed during the "on" period is determined by the transistor characteristics and by the size of the resistor, if any, placed in the base circuit of the transistor. In the circuit of Fig. 1, transistor 10 is shown as having a base resistor 33 whereas transistor 20 is shown as having no base resistor. The purpose of base resistor 33 is to equalize the time constants of the two transistors. Stated another way, where the two transistors are not "matched," the insertion of a series resistor in the base lead of the "fast" transistor tends to equalize the "on" times, thereby to give output pulses of equal duration at both collectors. Alternatively, in lieu of using a base resistor to equalize the time constants, the coupling capacitors 34, 35 may be made unequal, the smaller capacitor being used in the coupling to the base of the "slow" transistor. In the circuit of Fig. 1, for example, if the capacitor 35 were made .001 mfd., the base resistor 33 could be omitted.

As indicated previously, during the interval between pulses, both transistors are "off" and, ignoring leakage, which is negligible, no current is drawn from the battery 30. Accordingly, where the pulse duty factor is low, the circuit of the present invention consumes substantially less power than the conventional device in which one tube or transistor is "on" while the other is "off."

What is claimed is:

1. A free-running multivibrator comprising: a PNP junction transistor and an NPN junction transistor each having emitter, base and collector; a source of direct-current potential having its positive terminal connected directly to the emitter of the PNP transistor and its negative terminal connected directly to the emitter of the NPN transistor; a first resistance connecting the negative terminal of said source to the collector of said PNP transistor; a second resistance connecting the positive terminal of said source to the collector of said NPN transistor; means, including a first capacitor, connecting the base of said PNP transistor to the collector of said NPN transistor; means, including a second capacitor, connecting the collector of said PNP transistor to the base of said NPN transistor; a third resistance connecting the collector of said PNP transistor to that side of said first capacitor which is connected to the base of said PNP transistor; a fourth resistance connecting the collector of said NPN transistor to that side of said second capacitor which is connected to the base of said NPN transistor; and means for deriving output signals from the collector of at least one of said transistors.

2. An astable multivibrator comprising a PNP transistor and an NPN transistor each having emitter, base and collector; a source of direct-current potential; means for connecting said source to bias the emitter of said PNP transistor positive relative to its base; means for connecting said source to bias the emitter of said NPN transistor negative relative to its base; capacitive means coupling the base of each transistor to the collector of the other; resistance means connecting the base of each transistor to its own collector; and output means connected to the collector of at least one of the transistors.

3. A multivibrator comprising a PNP transistor and an NPN transistor each having emitter, base and collector; a source of direct-current potential; means for connecting said source to bias the emitter of each transistor in the forward direction; means, including series capacitance, connecting the base of each transistor to the collector of the other transistor; resistance means connecting the base of each transistor to its own collector; and means for deriving an output signal from the collector of at least one of the transistors.

4. A free-running multivibrator circuit comprising a PNP junction transistor and an NPN junction transistor each having emitter, base and collector; a source of direct-current potential connected to bias the emitter-base junction of each transistor in a low-resistance direction and to bias the collector-base junction of each transistor in a high-resistance direction; means providing an alternating-current connection between the base of each transistor and the collector of the other; means providing a resistive connection from the base of each transistor to its own collector; and a signal output circuit connected to the collector of at least one of the transistors.

5. A device comprising a PNP transistor and an NPN transistor each having emitter, base and collector; a source of direct-current potential; conductive means connecting the emitter of the PNP transistor directly to the positive terminal of the said source; resistive means connecting the collector of the NPN transistor to the positive terminal of said source; conductive means connecting the emitter of the NPN transistor directly to the negative terminal of said source; resistive means connecting the collector of the PNP transistor to the negative terminal of said source; means connecting the base of each transistor to the collector of the other; means, including resistance, connecting the base of each transistor to its own collector; and means for deriving an output signal from the collector of at least one of the transistors.

6. A device comprising a PNP transistor and an NPN transistor each having emitter, base and collector; a source of direct-current potential; means for connecting the emitter of the PNP transistor to the positive terminal of said source; means for connecting the collector of the NPN transistor to the positive terminal of said source; means for connecting the collector of the PNP transistor to the negative terminal of said source; means for connecting the emitter of the NPN transistor to the negative terminal of said source; means for connecting the base of each transistor to the collector of the other; and means for deriving an output signal from the collector of at least one of the transistors.

7. A device as claimed in claim 6 characterized in that means are provided for deriving output signals from the collectors of both of the transistors.

8. In combination; a PNP junction transistor and an NPN junction transistor each having emitter, base and collector; a source of direct-current potential; means connecting said source to bias the emitter-to-base junction of each transistor in the forward direction and the collector-to-base junction of each transistor in the reverse direction; and impedance means connecting the base of each transistor to the collector of the other.

9. Apparatus as claimed in claim 8 characterized in that means are provided for deriving an output signal from the collector of at least one of the transistors.

10. Apparatus as claimed in claim 9 characterized in that means are provided for deriving output signals from the collectors of both transistors.

References Cited in the file of this patent

UNITED STATES PATENTS

| | | |
|---|---|---|
| 2,769,907 | Lohman | Nov. 6, 1956 |
| 2,770,732 | Chong | Nov. 13, 1956 |